(12) United States Patent
Tardelli et al.

(10) Patent No.: US 9,369,421 B2
(45) Date of Patent: *Jun. 14, 2016

(54) METHOD AND APPARATUS FOR MANAGING COMMUNICATION EXCHANGES

(71) Applicants: AT&T Mobility II LLC, Atlanta, GA (US); AT&T Intellectual Property I, LP, Atlanta, GA (US)

(72) Inventors: Dana Tardelli, Atlanta, GA (US);
Ginger Chien, Bellevue, WA (US);
Adrianne Luu, Roswell, GA (US);
Leonid Razoumov, Riverdale, NY (US);
Nemmara K. Shankaranarayanan, Bridgewater, NJ (US)

(73) Assignees: AT&T Mobility II LLC, Atlanta, GA (US); AT&T Intellectual Property I, LP, Atlanta, GA (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/280,978

(22) Filed: May 19, 2014

(65) Prior Publication Data
US 2014/0258429 A1    Sep. 11, 2014

Related U.S. Application Data

(63) Continuation of application No. 13/307,473, filed on Nov. 30, 2011, now Pat. No. 8,762,468.

(51) Int. Cl.
| | |
|---|---|
| *G06F 15/16* | (2006.01) |
| *H04L 12/58* | (2006.01) |
| *H04L 12/64* | (2006.01) |
| *H04N 21/4788* | (2011.01) |
| *H04N 21/643* | (2011.01) |

(Continued)

(52) U.S. Cl.
CPC ............ *H04L 51/26* (2013.01); *H04L 12/6418* (2013.01); *H04L 43/04* (2013.01); *H04L 67/1095* (2013.01); *H04N 21/4788* (2013.01); *H04N 21/64322* (2013.01)

(58) Field of Classification Search
USPC .................................. 709/206, 201, 204, 203
See application file for complete search history.

(56) References Cited

U.S. PATENT DOCUMENTS

| | | |
|---|---|---|
| 8,095,612 B2 | 1/2012 | Cowan et al. |
| 8,769,090 B2 | 7/2014 | Tardelli et al. |

(Continued)

OTHER PUBLICATIONS

Tardelli, "Method and Apparatus for Managing Communication Inquiries", U.S. Appl. No. 13/307,127, filed Nov. 30, 2011.

(Continued)

*Primary Examiner* — Lan-Dai T Truong
(74) *Attorney, Agent, or Firm* — Guntin & Gust, PLC; Robert Gingher

(57) ABSTRACT

A system that incorporates teachings of the present disclosure may include, for example, obtaining a message and an importance rating for the message where the importance rating is determined by a second communications management agent of a server based on an analysis of content of the message. The system can access rating feedback information associated with the second communications management agent. A rating accuracy for the importance rating of the particular message can be determined based on the rating feedback information, and the method of providing the message to the intended recipient can be adjusted based on the determined accuracy. Other embodiments are disclosed.

20 Claims, 9 Drawing Sheets

(51) Int. Cl.
*H04L 29/08* (2006.01)
*H04L 12/26* (2006.01)

(56) References Cited

U.S. PATENT DOCUMENTS

| | | |
|---|---|---|
| 2004/0076178 A1 | 4/2004 | Botton |
| 2004/0143636 A1* | 7/2004 | Horvitz et al. ............... 709/207 |
| 2005/0050210 A1 | 3/2005 | Kennedy |
| 2005/0204001 A1 | 9/2005 | Stein et al. |
| 2006/0010217 A1* | 1/2006 | Sood .............................. 709/206 |
| 2006/0074727 A1 | 4/2006 | Briere |
| 2007/0094661 A1 | 4/2007 | Baird |
| 2007/0266097 A1* | 11/2007 | Harik et al. .................. 709/204 |
| 2009/0098859 A1 | 4/2009 | Kamdar |
| 2009/0113004 A1 | 4/2009 | Santos |
| 2010/0138788 A1 | 6/2010 | Wallis |
| 2011/0010182 A1 | 1/2011 | Turski et al. |
| 2011/0071893 A1 | 3/2011 | Malhotra |
| 2011/0251952 A1 | 10/2011 | Kelly |
| 2012/0303439 A1* | 11/2012 | Flitcroft et al. ............ 705/14.36 |

OTHER PUBLICATIONS

Fiveash, "Google explains 'why' ads target user's Gmail", http://www.theregister.co.uk/2011/11/01/google_ads_gmail/, Nov. 1, 2011.

* cited by examiner

700

800

900

METHOD AND APPARATUS FOR MANAGING COMMUNICATION EXCHANGES

CROSS-REFERENCE TO RELATED APPLICATIONS

This application is a Continuation of and claims priority to U.S. patent application Ser. No. 13/307,473 filed Nov. 30, 2011, the disclosure of which is hereby incorporated by reference herein in its entirety.

FIELD OF THE DISCLOSURE

The present disclosure relates generally to communications and more specifically to managing communication exchanges in a communication system.

BACKGROUND

Users have access to numerous communication devices for accessing information and communicating with other users. As communication technology continues to develop, the number of these types of devices and their compatibility continues to grow.

The selection of a device to be utilized by a user is often determined by practical considerations, such as which device is closest to the user. The selection process can also be based on user preferences, such as a user who prefers to engage in voice communications over text messages.

DETAILED DESCRIPTION

Figure 1:
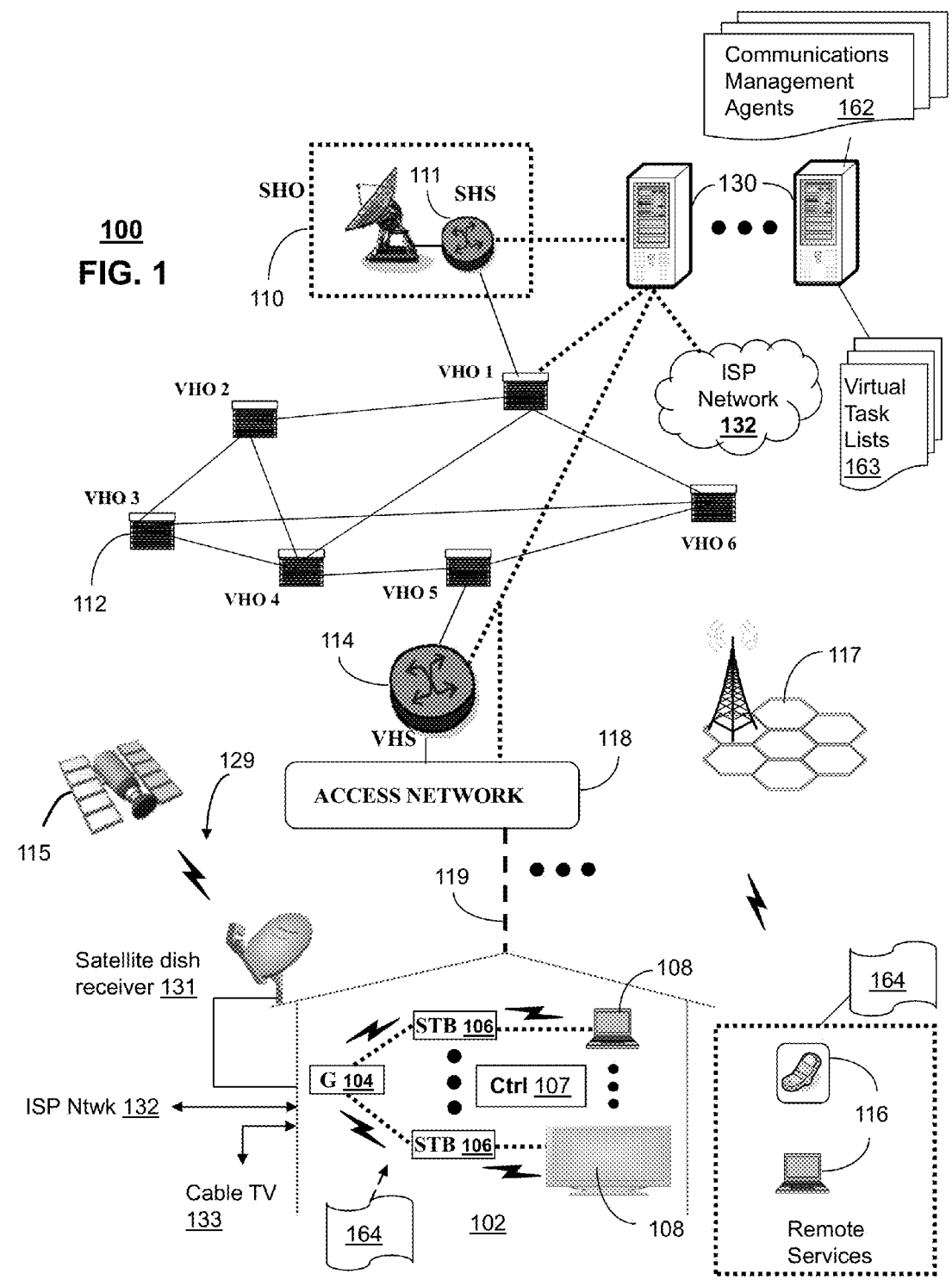
FIGS. 1-2 depict illustrative embodiments of communication systems that provide communication services.

The present disclosure describes, among other things, illustrative embodiments for utilizing communications management agents to manage messages being exchanged between communication devices of various entities or parties. The agents can be implemented using computer instructions executed by one or more servers in communication with communication devices over a network. The message exchange can be based on monitored information associated with the entities, including presence and scheduling data, as well as other information, such as biometric data. The communications management agents can determine various criteria associated with the exchange of the messages, including a time of delivery, a format for delivery and/or a communication device to receive delivery. In one or more embodiments, messages that originate in a first format from a sender can be received by the recipient in a second, different format based on dynamic message handling rules that are implemented by the communications management agent corresponding to the recipient.

In one or more embodiments, importance ratings can be generated by the communications management agents to facilitate determining a process for delivery of the message, such as a time, message format and recipient communication device. Importance ratings can be analyzed for their accuracy, and a history of ratings accuracy can be utilized for managing delivery of subsequent messages.

In one or more embodiments, virtual task lists can be maintained for the various entities and task requests can be exchanged between communication devices of entities, such as based on presence data, scheduling data, and/or a past history of performing tasks for each other.

One embodiment of the present disclosure includes a first server of a group of servers, where the first server includes a memory having computer instructions and a controller circuit coupled to the memory. The controller circuit, when executing the computer instructions, can perform a method that comprises monitoring behavior information associated with a first user where the monitored behavior information includes presence data and scheduling data. The controller circuit can receive a message from a first communication device of the first user, where the message is directed from the first user to a second user. The controller circuit can analyze content of the message to determine a subject matter of the message and determine an importance rating of the message based on the determined subject matter and the monitored behavior. The controller circuit can provide the message and the importance rating to a second server of the group of servers that is executing computer instructions for a communications management agent that is associated with the second user and that determines a time and message format for receipt of the message by a second communication device of the second user based on the importance rating. The controller circuit can receive a rating feedback based on a determination of an accuracy of the importance rating for the message, where the rating feedback is utilized by at least some of the group of servers in analyzing an accuracy of a second importance rating for a second message provided by the controller circuit.

One embodiment of the present disclosure is a system that includes at least one server executing computer instructions to enable a first communications management agent associated with a first user and executing the computer instructions to enable a second communications management agent associated with a second user. The at least one server, when executing the computer instructions, can perform a method that comprises obtaining a message that originates from a second communication device of the second user, where the message is directed to the first user. The at least one server can obtain an importance rating for the message, where the importance rating is determined by the second communications management agent based on an analysis of content of the message. The at least one server can obtain rating feedback information associated with a group of importance ratings generated by the second communications management agent and to determine a rating accuracy of the importance rating for the message based on the rating feedback information. The at least one server can provide message information representative of the message to a first communication device of the first user according to the importance rating and the determined rating accuracy.

One embodiment of the present disclosure includes a non-transitory computer-readable storage medium having computer instructions which when executed by at least one processor cause the at least one processor to perform a method that comprises receiving messages directed to a first user from a plurality of sources. The computer instructions enable monitoring first behavior information associated with the first user, where the first monitored behavior information includes first presence data and first scheduling data. The computer instructions enable analyzing content of each of the messages. The computer instructions enable generating a summary of each of the messages based on the analysis of the content. The computer instructions enable determining a time, a message format and at least one first communication device for delivering each of the generated summaries to the first user based on the monitored first behavior information and the analysis of the content. The computer instructions enable adjusting a first virtual task list for the first user based on the analysis of the content. The computer instructions enable obtaining second behavior information associated with a second user, where the second behavior information includes second presence data, second scheduling data and prior interaction data. The prior interaction data can include information associated with tasks from a second virtual task list of the second user that were performed by the first user. The computer instructions enable providing a task message to a communications management agent of the second user according to the second behavior information, where the task message requests performance by the second user of a task from the first virtual task list.

FIG. 1 depicts an illustrative embodiment of a first communication system 100 for providing communication services that can include delivering messages and/or content to various communications devices. The communication system 100 can manage the delivery of communications (e.g., via a digital agent(s)) to one or more users based on various criteria, including monitored behavior of the sender and/or the recipient, importance ratings of the communications, analysis of the content of the communications, and so forth. The system 100 can provide for feedback on the importance ratings in order to improve the accuracy of ratings being generated. The exemplary embodiments herein refer to incoming messages, which can include any type of incoming communications, including voice communications, text messages, email messages, video conferencing, voice mail messages, social network posts, M2M alerts, calendar requests/management, content generally posted that may be of interest to the user, advertisements, and so forth.

The system 100 can provide for generating, adjusting and otherwise managing virtual task lists 163 for a group of users. Task requests can be exchanged between users based on various criteria, including scheduling data and presence data of the users. The task requests can also be generated based on prior interaction data representing prior tasks that were performed on behalf of other users.

The communication system 100 can represent an Internet Protocol Television (IPTV) media system. The IPTV media system can include a super head-end office (SHO) 110 with at least one super headend office server (SHS) 111 which receives content from satellite and/or terrestrial communication systems. In the present context, content can represent in whole or in part, for example, messages, text, audio, moving images such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia content, including messages and/or broadcast content, via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control). Other data can be distributed to the media processors 106 via the gateway, including voice messages, text messages, voice communications, video conferencing and combinations thereof. Other techniques and/or components can be utilized for delivering communications, such as described in U.S. application Ser. No. 13/307,127 entitled "Method And Apparatus For Managing Communication Inquiries" filed on Nov. 30, 2011 by Tardelli et al., the disclosure of which is hereby incorporated by reference herein in its entirety.

The gateway 104, the media processors 106, and/or media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can also be used in the system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

The embodiments of the present disclosure can apply to other over-the-air and/or landline media content services system.

Some of the network elements of the IPTV media system can be coupled to one or more computing devices 130, a portion of which can operate as a web server for providing web portal services over an Internet Service Provider (ISP) network 132 to wireline and/or wireless devices, including media devices 108 and/or portable communication devices 116.

Multiple forms of media services can be offered to media devices over landline technologies in communication system 100 such as through the devices and/or techniques described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Communication system 100 can also provide for all or a portion of the computing devices 130 to function as a communications management server (herein referred to as server 130). The server 130 can use common computing and communication technology to perform function 162, which can include among things, implementing a communications management agent for one or more users of system 100 to manage communications associated with the user(s), including incoming communications and outgoing communications. The exemplary embodiments can utilize any number of servers 130 which can implement any number of communications management agents 162. The agents 162 can be executed for each user individually or can be shared amongst users, such as amongst a related group (e.g., family members).

In one or more embodiments, the server 130 can enable different communications management agents 162 to interact with each other as an intermediary in a process for delivering messages between users that are associated with the particular agents. In one or more embodiments, the communications management agents 162 can monitor behavior or otherwise obtain behavior information for a corresponding user with which the agent is associated. For instance, communication devices can have software for providing behavior information to the agent 162, such as gateway 104, media processors 106, media devices 108 and/or mobile devices 116 having software 164 for providing information, including presence data, scheduling data and/or biometric data, to the communications management agent 162.

In one or more embodiments, the communications management agents 162 can actively monitor for devices of the user from which information associated with the user can be retrieved. The active monitoring can include numerous techniques such as interaction with the user to request input as to various devices that the user utilizes. For instance, a user can identify devices and software applications (e.g., social networks) that the user utilizes, and the communications management agents 162 can then communicate with those identified devices and software to establish a dataflow. The provisioning of the communications management agent 162 with the potential sources of information can be done through use of a provisioning GUI that can provide questions and input fields for the user. The provisioning can be done via other methods, including detection of devices in proximity to the user (e.g., detecting wireless signal) and determining whether the device can be used for obtaining information associated with the user.

The active monitoring of the communications management agent 162 can also include analyzing other information associated with the user to determine whether new devices or software are being utilized by the user. For example, electronic billing of a user can be analyzed to determine that an electronic device or software has recently been purchased which may be able to provide behavior information. The provisioning process can include determining the potential sources and communicating with the potential sources to establish a dataflow so that the information or monitored behavior can be received from the various devices by the communications management agent 162.

In one or more embodiments, communications management agents 162 enable processing of incoming communications (e.g., voice or text messages and/or voice communications) to determine how the incoming communications are to be processed such as according to dynamic handling rules that are being adjusted based on various information, including the monitored behavior information of the recipient and/or the sender. The dynamic handling rules enable the server 130 to manage the delivery of messages to users based on all or a portion of information available that is related to the recipient of the messages and/or the sender of the messages. The dynamic handling rules can determine timing of processing messages including processing it immediately, delaying the processing such as based on a prioritization determined by the communications management agent 162 and so forth. The dynamic handling rules can enable delegating the processing to another device or system and/or delaying processing by providing an immediate response that indicates that the communications management agent 162 will process the information for a delivery determination at a later time.

In one or more embodiments, the communications management agents 162 can utilize scheduling data and/or presence data to process the incoming messages, such as updating a user's calendar automatically with the incoming messages or determining a user is present in a car and adjusting a navigation system of the car based on incoming messages. In one or more embodiments, the messages can be analyzed, including via parsing engines and/or natural language engines, to determine a subject matter of the messages and/or summarize the messages. In one or more embodiments, the communications management agents 162 can analyze the incoming messages and respond to the sender prior to delivering the incoming messages to the recipient, such as sending a response that requests additional information from the sender based on a determination that the recipient will need more information to make a decision associated with the incoming message.

The monitored behavior or other information associated with the recipient and/or the user for making determinations as to processing of the incoming messages can vary and can be obtained in a number of different ways, including in real-time or in an offline process. For example, the communications management agents 162 can obtain biometric data associated with the recipient and/or sender. For instance, the biometric data can be data associated with heart rate, blood pressure, respiratory rate and so forth. This biometric data can be used in a number of different ways by the communications management agents 162, such as determining whether a user is engaged in a vigorous activity which may render them less likely to desire to receive an incoming message. On the other hand, similar information can be indicative of the user feeling concerned or anxious about an event which may render them more likely to desire to receive an incoming message. The biometric data can be used alone or with other information (e.g., scheduling and/or presence data) to estimate or predict an activity that the user may be engaged in which can then be used as part of the determination as to delivering an incoming message to the user. The biometric data can be obtained from a variety of sources, including wirelessly from sensors connected to or otherwise in communication with the user. As an example, the user may be exercising utilizing a wireless heart rate monitor. Wireless signals from the heart rate monitor can be monitored by a communication device of the user, such as a mobile phone, and transmitted to the communications management agent 162.

The monitored information can be associated with time and/or location data of the user, including scheduling data and/or presence data. For example, the communication management data 162 can actively monitor a calendar of the user for scheduling data and can actively monitor electronic billing information of the user to detect purchases that are indicative of time or location commitments of the user. For instance, a credit card bill may indicate that the user has purchased tickets to a football game in Kansas City. The communications management agent 162 can determine the time of the football game and estimate that the user will need to travel to Kansas City during a particular time frame. The particular time frame for travel can be further estimated based on other time and/or location commitments for the user, such as based on a calendar notice that the user has a meeting in Chicago on the day before the football game. The communications management agents 162 can also interact with the user to verify or otherwise determine the estimated time frame for travel. In one embodiment, the communications management agent 162 can determine an estimated time frame for travel prior to requesting a verification of the travel schedule from the user. By knowing that the user is travelling during a particular time period, the communications management agent 162 can apply handling rules so that incoming messages are processed as desired by the user during travel, such as a user who desires only to receive emails when travelling or a user that desires only to receive voice mail messages limited to family.

The monitored information can be associated with a measure of the value of the relationship between the sender and the recipient. This measure can be an adjustable or otherwise changing measurement, such as based on increased positive interaction between the user and sender which results in an increase in the value or an increased negative interaction between the user and sender which results in a decrease in the value. The communications management agent 162 can determine the increase in positive interaction or determine the increase in negative interaction in a number of different ways, including monitoring the number of communications between the parties, analyzing the content of communications between parties to determine if the communications are positive or negative (e.g., determining a subject matter for a message that is indicative of a problem arising between the parties), determining social interaction between the parties such as detecting that the parties attended a baseball game together, determining an avoidance by one of the parties towards the other such as from cancelling social interaction events between the parties, and so forth. In one or more embodiments, the relationship value can be adjusted by the user. For instance, the communications management agent 162 can determine a relationship value based on information such as social interaction, number of communications between the parties and content of communications. The relationship value can then be presented to the user to verify or otherwise adjust the value.

In one or more embodiments, the relationship value can be a confidential value that is known by the communications management agent 162 and the user, but is not shared with the other user. In other embodiments, the relationship value can be shared with the other users and their corresponding communications management agents, including sharing changes in the relationship values as they occur so that a deterioration or an improvement of a relationship between users can be indicated. The relationship value can also be determined based on other factors, such as whether the other user is a family or friend, or whether the other user is a work colleague.

The determination of processing of the messages can be based on other factors, including a mindshare associated with the user that is indicative of a preferred time to talk to the user, the sender's social connectivity, a balance sheet with the sender (e.g., the sender has an obligation to me), sender assigned metadata, reputation of the sender, determined nature of the content (e.g., humorous, urgent, etc.), size of content, a content novelty index, supplementary sender-based agent information (e.g., subject matter or urgency), and/or the message spoken explicitly by the sender.

The monitored information can be utilized in combination with the virtual task list 163 of the user which is maintained by the server 130 and/or the communications management agent 162. The virtual task list 163 can be a list of tasks that need to be performed and which are associated with the particular user. The virtual task list 163 can be adjusted based on the monitored information and/or incoming communications. For instance, the communications management agent 162 can analyze incoming communications to determine if the communications request or require the recipient to perform a task. In one or more embodiments, the task can be any type of task, including buying milk on the way home from work or picking up a family member before going to work.

The virtual task list 163 can be adjusted based on the ability of the user to perform the task. For example, if the communications management agent 162 receives a message from the user's family requesting that the user buy milk on the way home from work but the communications management agent 162 determines that the user is working overtime past the store closing time then the user can be deemed unavailable for performing the task. The communications management agent 162 can utilize the monitored behavior information to determine that the user is scheduled to work overtime, such as an analysis of the content of a message from the user's supervisor requesting the overtime work and/or determining that the user has accepted the request (e.g., via an email or voice mail message provided by the user to the supervisor). In one or more embodiments, the communications management agent 162 can send a notice to the user to remind the user that he is unable to perform the task and/or can send a message to the user's family (e.g., via another communications management agent associated with the family) advising the family of the user's unavailability to perform the task. As described above, the various monitored information of the user can be utilized in determining whether a task should be added to the virtual task list 163 of the user, including scheduling data, presence data, relationship value associated with the other user requesting the task, and so forth.

In one or more embodiments, the communications management agent 162 can determine a time, a message format and at least one first communication device for delivering a message and/or a summary of the message to the user based on the monitored behavior information and/or an analysis of the content of the message. The communications management agent 162 can then adjust the virtual task list 163 for the user based on the analysis of the content. Other behavior information associated with another user can then be obtained, such as presence data, scheduling data and/or prior interaction data (e.g., information associated with tasks from a virtual task list 163 of the other user that were performed by the user). In this example, a task message can be sent to the communications management agent 162 of the other user according to the obtained other behavior information. The task message can request performance by the other user of the task from the user's virtual task list 163. In this way, users can perform tasks for one another that are established and coordinated between the communications management agents 162 and where the coordination of the tasks can be based on a history of each party performing the tasks so that a balance of task performance between parties can be achieved and maintained.

In one or more embodiments, the assignment of a task can require verification by one or both of the requestor and the party assigned the task. In other embodiments, the communications management agent 162 can refuse to accept a request for a task assignment from another communications management agent (e.g., because of an imbalance in the number of tasks that have been performed by the requestor upon behalf of the potential assignee). In this example, the communications management agent 162 that refuses the task assignment can respond by advising of the imbalance in the distribution of tasks, can respond with no reason for the refusal to accept the task and/or can respond with an alternative reason for refusal to accept the task. In one or more embodiments, the communications management agent 162 can monitor for the performance of the task by the other user and can adjust the prior interaction data according to a completion of the task. The monitoring of the completion of the task can be based on various information, including information obtained from other sources that are associated with the task. For instance, presence data can be obtained for a first co-worker where the task of taking the first co-worker to work was assigned from the user's virtual task list 163 to a second co-worker.

In one or more embodiments, the virtual task list 163 can be co-managed between the user and the communications management agent 162 and/or between two or more communications management agents for associated users (e.g., a family virtual task list that is co-managed by communications management agents 162 that correspond to the members of the family). In this example, the co-management can be subject to conflict rules, such as prioritization of tasks originated by the parents over tasks originated by the child or prioritization based on a subject matter of the task (e.g., a task to pick up the child from school is a higher priority than a task to buy milk from the store).

In one or more embodiments, the virtual task list 163 can be utilized in the determination of processing incoming messages. For instance, a length of a virtual task list 163 or the importance of tasks on the virtual task list may be indicative of a desire by the user not to immediately receive messages (e.g., no voice calls) other than high priority messages from family or friends. In one or more embodiments, the communications management agent 162 can analyze the content of the tasks and determine incoming messages that are necessary or helpful to completing one or more of the tasks in order to determine whether the incoming messages should be immediately delivered to the user, such as via a voice call or text message, or should be stored for later access by the user, such as via a voice mail message or an email message. In one or more embodiments, the expected time to do a task from the virtual task list as compared to the actual time can be considered in the determination of processing incoming images.

In one or more embodiments, the communications management agents can provide a platform for exchanging monitored information of the users or a portion thereof. The exchange of such information can be a limited or negotiated process, such as a first user agreeing to provide only presence data in exchange for the presence data of a second user. In other embodiments, the exchange can be unlimited, such as including all information for both the first and second users in the information exchange. The information exchange can be a one-time event or recurring event each time a message is to be delivered between the parties or the information exchange can be a continuous event, such as periodically exchanging all or selected portions of the monitored information according to a pre-determined schedule. The negotiation can be performed between the communications management agents 162 and/or between the users.

In one or more embodiments, portions of the monitored information can be filtered by the communications management agent 162 based on quality. For instance, presence data can be compared by the communications management agent 162 to scheduling data to detect conflicts, and other information can be obtained or otherwise analyzed to determine the accuracy of the data, such as analyzing content data from messages or the communications management agent requesting verification from the user.

In one or more embodiments, filtering of the monitored behavior information can be performed by any number of devices, including devices other than server 130 such as the portable communication devices, an STB, and so forth. The filtering can be performed based on various techniques, including comparison of similar data received from different sources (e.g., presence data from two different devices indicating a conflict in presence), statistical and/or historical analysis of the monitored behavior information to determine accuracy, and so forth.

In one embodiment, the software functions 164 can include a first communication device 116 retrieving monitored information from another communication device, and providing the monitored information to the communications management agent 162 of the server 130. In this example, the communications management agent 130 does not need to be directly receiving the monitored information from each of the devices associated with the user, but rather can be in communication with a first portion of devices associated with a user that are themselves in communication with a second portion of devices associated with a user. In this manner, the efficiency of the dataflow between the devices associated with the user and the communications management agent 162 can be improved.

Figure 2:
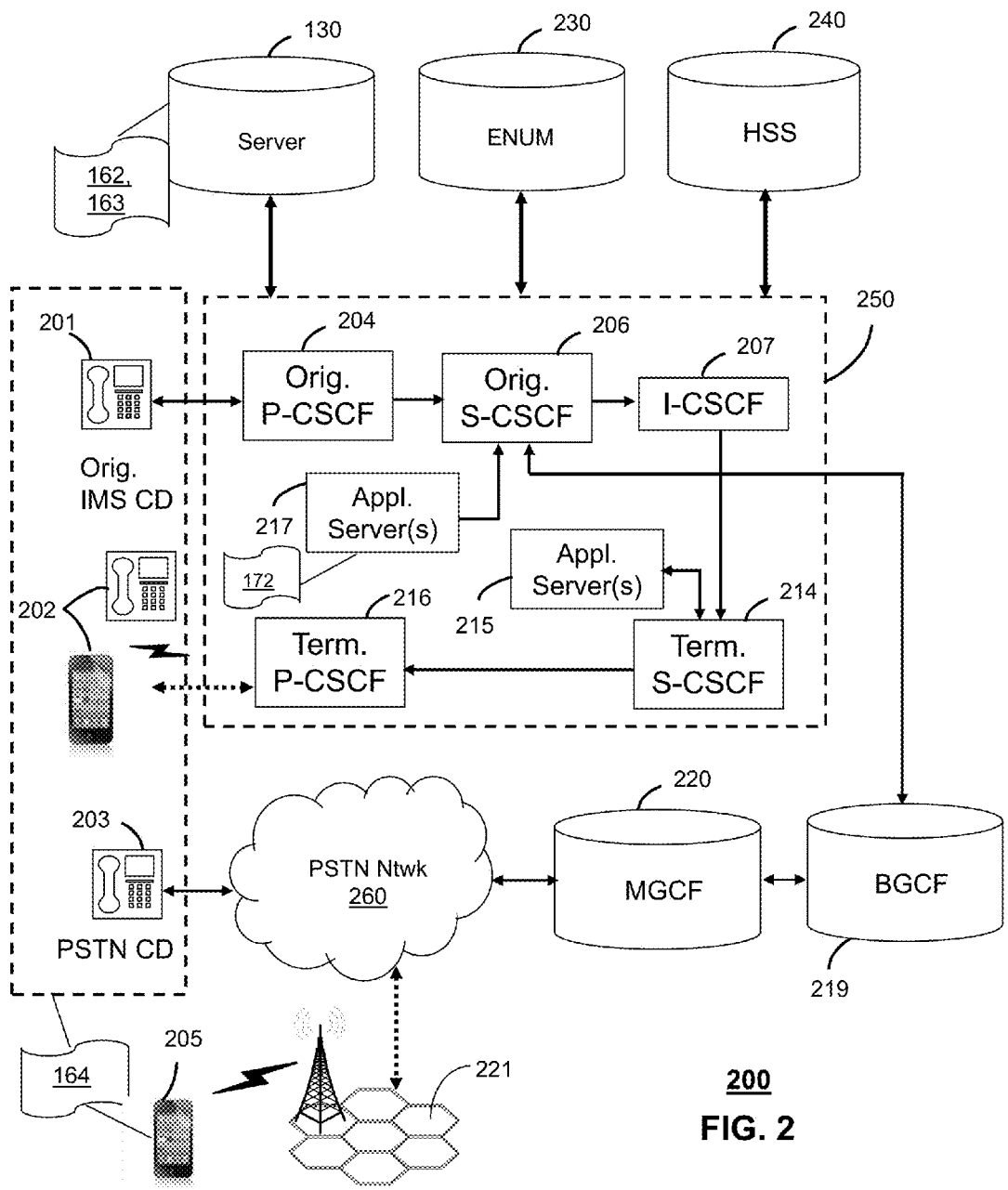

FIG. 2 depicts an illustrative embodiment of a communication system 200 employing IP Multimedia Subsystem (IMS) network architecture to facilitate the combined services of circuit-switched and packet-switched systems. Communication system 200 can be overlaid or operably coupled with communication system 100 as another representative embodiment of communication system 100.

The communication system 200 can provide for the gathering by the communications management agents 162 of the monitored information associated with each of the users and the determination of the processing of incoming messages based on the monitored information. Communication system 200 enables exchange of the monitored information and/or the incoming messages via packet-switched and/or circuit-switched communication technologies.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1, including the monitored information gathered from various device associated with the user. It is further contemplated that the CDs of FIG. 2 can operate as wireline and/or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other wireless network technologies can be utilized by the present disclosure. Accordingly, multiple wireline and wireless communication technologies are usable with the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250.

Communication system 200 can include or otherwise be coupled with server 130 of FIG. 1 for purposes similar to those described above. It is further contemplated by the present disclosure that the communications management agents 162 can communicate with one or more components of system 200, including the HSS 240 and the S-CSCF 206, for gathering at least a portion of the monitored behavior information (e.g., presence data). It is further contemplated that the server 130 can be an integral part of the application server(s) 217.

Figure 3:
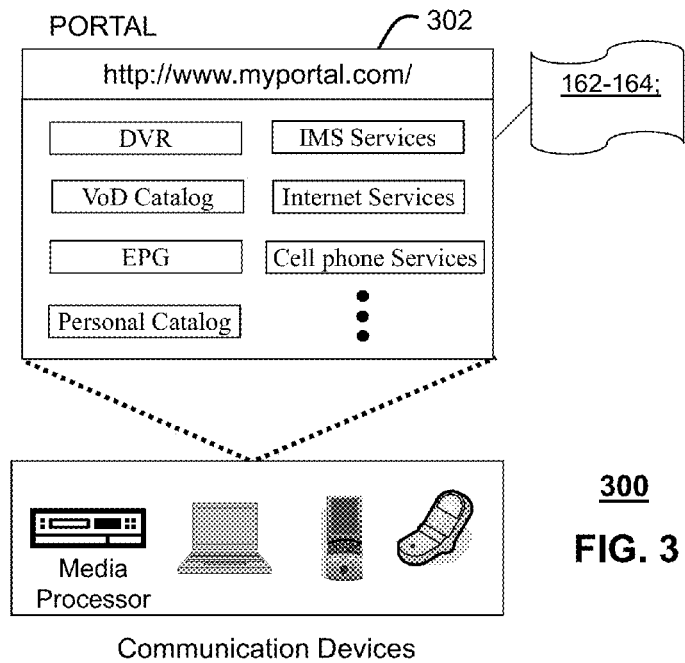
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning the communications management agents 162 with devices, software and other sources that can be monitored for obtaining the monitored information upon which the dynamic message handling rules are maintained and revised. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-164 of the devices of FIGS. 1-2, respectively, as described earlier. In one or more embodiments, the web portal 302 can be used for interaction between a user and the user's communications management agent 162. For instance, a user can adjust a virtual task list, set user preferences to be utilized in combination with the dynamic message handling rules, update a relationship value, or provide user feedback on an accuracy rating provided by another communications management agent via the web portal 302.

Figure 4:
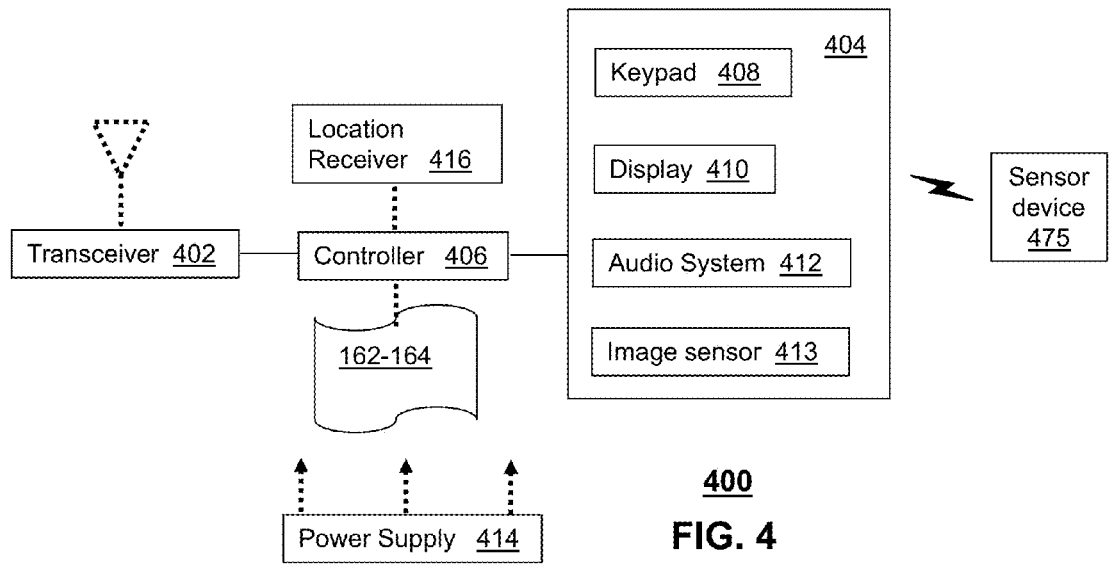
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

In one or more embodiments, the communication device 400 is adapted to detect and/or communicate with a sensor device 475 which generates user data, such as biometric data of a user. The communication between device 400 and device 475 can utilize wired and/or wireless communication.

The communication device 400 can be adapted to perform the functions 162-164 of the server 130, media processor 106, the media devices 108, and/or the portable communication devices 116 of FIG. 1, as well as the IMS CDs 201-202 and/or PSTN CDs 203-205 of FIG. 2. It will be appreciated that the communication device 400 can also represent other common devices that can operate in communication systems 100-200 of FIGS. 1-2 such as a gaming console and a media player.

In one or more embodiments, the communication device 400 can obtain and store monitored information from other communication devices associated with the user. The stored monitored information, as well as monitored information generated by the device 400 can then be provided to the communications management agent 162 for the user associated with the device 400.

Illustrative embodiments of methods that can operate in portions of the communication device of FIG. 4 are described below.

Figure 5:
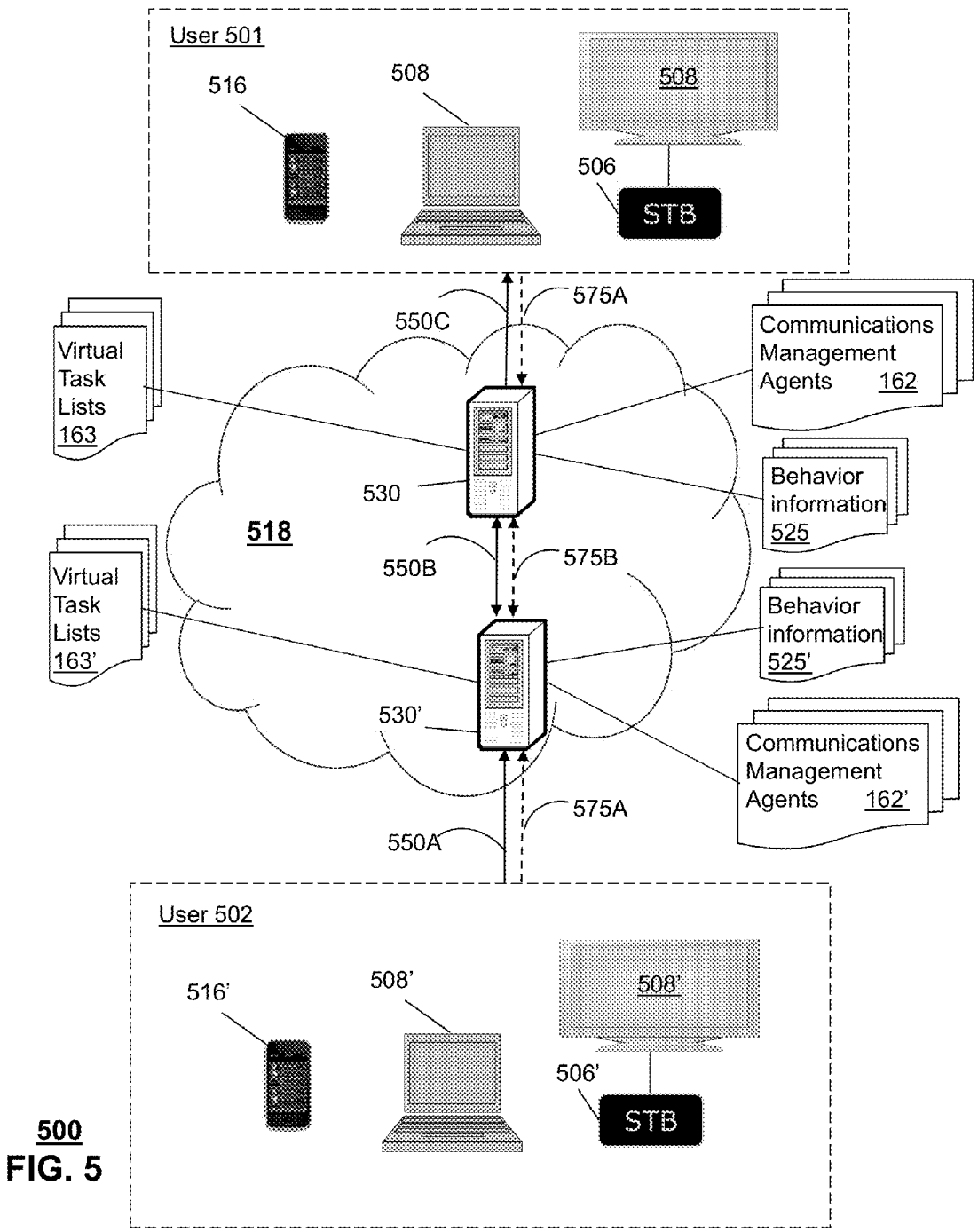
FIGS. 5-6 depict illustrative embodiments of communication systems that provide communication services.

FIG. 5 depicts an illustrative embodiment of a system 500 for managing the delivery of incoming messages. System 500 can be overlaid or operably coupled to communication systems 100-200 as another representative embodiment of communication systems 100-200.

In this exemplary embodiment, a user 501 has various communication devices including media processor 506, media device 508 and portable device 516. The user 501 has a communications management agent 162 implemented on a server 530 within network 518 that obtains monitored behavior information 525 associated with the user 501. The monitored behavior information can be various forms of data, such as the data described with respect to system 100 of FIG. 1, and can include presence data, scheduling data, biometric data, communications history data, relationship value data with respect to other users, length and urgency of presently pending virtual task lists, and so forth. The communications management agent 162 also maintains a virtual task list 163 that is associated with the user 501. System 500 also includes a user 502 having various communication devices including media processor 506', media device 508' and portable device 516'. The user 502 has a communications management agent 162' implemented on a server 530' within network 518 that obtains monitored behavior information 525' associated with the user 502. The communications management agent 162' also maintains a virtual task list 163' that is associated with the user 502. It should be understood by one of ordinary skill in the art that any number of users, servers, communications managements agents, media processors, media devices and/or portable devices can be utilized, which can be in other configurations, including sharing of servers and/or sharing of communications management agents. It should be further understood that other types of devices can be utilized in system 500, including other devices associated with the users 501, 502 for obtaining monitored behavior information and/or for delivering incoming messages, as well as other types of network elements for facilitating communications between the various devices and through the network 518, including routers, switches, DSLAMs, and so forth.

In this exemplary embodiment, a message 550A can be originated by the user 502, such as at a portable communication device 516' or other communication device, where the message is directed to user 501. The message 550A can be of various formats as previously described herein, including but not limited to voice communications, emails, text messages, video message and so forth. The message 550A can also be an indirect communication such as a posting on a website that is directly intended for user 501 (e.g., posting on a social network page of the user 501 or posting on a website with information indicative of the posting being directed to user 501). In one embodiment, the message 550A can be a posting on a website that is indirectly intended for the user 501, such as posting information that would be of interest to the user 501, where the communications management agent 162' and/or the communications management agent 162 monitors for such postings (e.g., based on the posters, the website and/or the content posted) and determines whether the posting or a message representative of the posting should be delivered or otherwise directed to the user 501.

In one or more embodiments, the message 550A can be originated without a designation of a recipient communication device and/or without a designation of a message format. For instance, the user 502 can input a voice recording into the portable device 516' and identification information associated with the user 501 can be utilized by the communications management agent 162' for selecting a recipient communication device of the user 501 and/or a format for the message. In one or more embodiments, the message 550A without a designation of the recipient communication device and/or without the designation of the message format can be provided from the communications management agent 162' to the communications management agent 162 for the communications management agent 162 (i.e., the agent for the recipient user 501) to determine the recipient communication device and/or the message format. The identification information can be directly provided by the user 502 such as a voice input of the name of user 501 in response to a prompt for the intended recipient, or can be indirectly provided by the user 502 such as determined by the communications management agent 162' from an analysis of the content of the message.

In one or more embodiments, the sender's communications management agent 162' can designate a recipient communication device and/or designate a message format, which may or may not be the recipient device and/or message format that is utilized in the delivery of the message 550A to the user 502. For example, the designation of the recipient device and/or message format can be a suggestion. In another example, one or both of the designation of the recipient device and the message format can be contingent designations where the user 502 intends on the message 550A being delivered only if the designated recipient device and/or the message format are utilized in the delivery.

In one or more embodiments, the message 550A provided by the communications management agent 162' to the communications management agent 162 can be representative of the originated communication from the user 502. For example, the user 502 can input a voice recording into portable device 516' that is intended for delivery to user 501. The communications management agent can generate a message which is representative of the voice recording. In one or more embodiments, the representative message can be a summary of the voice recording, such as based on a content analysis of the voice recording performed by the communications management agent 162' using voice recognition, natural language engines and/or parsing engines. In one or more embodiments, the representative message can be an enhanced version of the recording which includes all of the content of the voice recording and includes additional information generated by the communications management agent 162', such as subject matter headings, links to content referenced in the voice recording, identification information for individuals referenced in the voice recordings, and so forth. The additional information can be generated by the communications management agent 162' using various techniques, including analysis of the content of the voice recording (e.g., using voice recognition, natural language engines and/or parsing engines), analysis of other communications that are determined to be associated with the voice recording, and/or a determination (e.g., by the communications management agent 162') of expectations of the user 501 as to information that should be included in the message. For instance, the communications management agent 162' can determine based on previous communications exchanged between the users 501, 502 via the communications agents 162, 162', that the user 501 desires messages to include email addresses for any individual identified in a message. This determination can be made by the communications management agent 162' based on a history of message exchanges in which the communications management agent 162 requested such information. It should be further understood that while the example describes use of a voice recording, the messages can be originated in various forms, including text, video and so forth.

In system 500, the original message 550A, a representative message generated by the communications management agent 162' and/or other communications can be exchanged between the communications management agent 162' and the communications management agent 162, as indicated by arrow 550B. In one or more embodiments, a portion of the communications exchange 550B between the communications management agents 162, 162' can be performed to obtain a revised version of the message and/or to obtain data (indicated by arrow 575B) that is used by one or both of the agents 162, 162' for processing the dynamic message handling rules and/or for revising or otherwise reformatting the message.

As indicated by arrows 575A, data can be provided to or otherwise obtained by the communications management agents 162, 162' for processing the dynamic message handling rules. In one or more embodiments, all or a portion of the communications exchange 550B can be performed automatically between the communications management agents 162, 162' without user intervention. The amount and type of data exchanged between the communications management agents 162, 162', including the amount and type of the monitored behavior information 525 can vary. In one or more embodiments, no information, limited information or all information from the monitored behavior information 525 can be exchanged between the communications management agents 162, 162'. The determination of the amount and type of the monitored behavior information 525 can be based on a number of factors, as well as different decision makers. For example, a user may designate information which can and cannot be shared with other communications management agents. In another embodiment, the sharing of the monitored behavior information can be determined by one of the communications management agents based on a prior history of sharing with another communications management agent and/or a prior history by the other communications management agent maintaining the confidentiality of the shared information.

In one or more embodiments, the exchange of the monitored behavior information 525 and/or 525' can be performed with controls on the distribution of the information, such as permitting use of the monitored information by the two communications management agents 162 and 162' that have exchanged all or a portion of the information but prohibiting further distribution of the information to other communications management agents. In one or more embodiments, the negotiation for the exchange of monitored information can be based on future or past exchanges of such information. For instance, the communications management agent 162 can agree to presently provide the monitored behavior information 525 of the user 501 to the communications management agent 162' if the communications management agent 162' agrees to exchange monitored information in the future (in the event that the user 501 seeks to send a message to the user 502' in the future).

In system 500, the communications management agent 162 can receive the message 550A or a representative message generated by the communications management agent 162' and can apply the dynamic message handling rules to determine a process for delivery of the message to the user 501, including timing, message format, and/or recipient communication device. The dynamic message handling rules can be applied by the communications management agent 162 utilizing the monitored behavior information 525, all or a portion of the monitored behavior information 525' and/or other factors. In one or more embodiments, the communications management agent 162 can analyze the content of the message and can utilize that analysis (e.g., a determination of a subject matter of the content) for applying the dynamic message handling rules, including in combination with the monitored behavior information. In one or more embodiments, the communications management agent 162 can determine or otherwise predict the particular activity that the user 501 is currently engaged in based on the monitored behavior information 525 and can determine whether the user 501 would desire to receive a message 550C that pertains to the determined subject matter. The message 550C can be the message that was received from the communications management agent 162' or can be a message representative of the received message, including a summarized version (e.g., based on the content analysis performed by agent 162) or an enhanced version that includes additional information that the communications management agent has determined the user 501 would desire to be included in the message. In one or more embodiments, the communications management agent 162 can determine a message format (e.g., text, voice, or video) and/or a recipient communication device based on the monitored behavior information 525, 525' and/or the content analysis.

As an example, the communications management agent 162 can receive a message from communications management agent 162' which is in the form of a video conference message and that includes a subject heading entitled business proposal. The communications management agent 162 can analyze the content of the message to determine that the message pertains to an offer to retain a first entity to perform a landscaping contract. The communications management agent 162 can access the monitored behavior information 525 which includes scheduling data from a calendar of user 501 that indicates that the user 501 is presently in a meeting and the subject heading for the meeting is landscape work. The communications management agent 162 can access other data of the monitored behavior information, such as presence data of other individuals, content analysis of previous messages received by the user 501 that are associated with the landscape contract and so forth, to determine that the user 501 is presently meeting with a second entity regarding the landscaping contract. Based on this information, the communications management agent 162 can determine that the user 501 would desire to receive the message that includes the offer from the first entity and would desire to receive it in a format that is subtle, such as a summary text message, in order to have the information in-hand during the discussions with the competitor second entity. In this example, the communications management agent 162 can determine details of the current activity of the user 501, reformat the message from a video conference message to a text message that summarizes the offer from the first entity, and deliver the text message to the portable device 516 of the user 501. For instance, the communications management agent 162 can determine that the user 501 desires only to see the details of the first entity's offer such as a text message reading: "$25,000 annual contract bid by the first entity."

In one or more embodiments, importance ratings can be generated and assigned to messages by either or both of the communications management agents 162, 162'. The agent importance ratings can be included with importance ratings provided by the user 502 that originated the message or the recipient user 502 that is forwarding the message to another user. The use of importance ratings generated by the communications management agents 162 and/or 162' enables a credibility system to be implemented so that agents and their users can have a better understanding of the accuracy of the importance ratings.

In one or more embodiments, the communications management agent 162' can receive the message 550A and can perform a content analysis (e.g., using voice recognition, parsing engines and/or natural language engines) to determine a first importance rating for the message. The determination of the first importance ratings can be based on other information including the monitored behavior information 525' of the user 502.

As an example, the communications management agent 162' can determine from the content analysis and the monitored behavior information 525' (e.g., scheduling data, presence data, prior message content, biometric data and so forth) that the user 502 desires to receive a response to the message which is an invitation to meet before the end of the day to finalize the landscape contract described above with respect to the earlier example. For the user 502, it is important to receive the response before the end of the day because the user 502 is scheduled to begin work on another landscaping bid the following day with another potential client and which the user 502 will not be bidding for if the offer to user 501 is agreed upon. The communications management agent 162' may place a high priority importance rating on message 550A and provide it to the communications management agent 162. The particular scale and indicia of the importance rating can vary and can be a numerical scale (e.g., 1 to 10) or a verbal scale (e.g., low, medium, high, very high, read immediately).

Continuing with this example, the communications management agent 162 can utilize the first importance rating in its application of the dynamic message handling rules in combination with other criteria, including the monitored behavior information 525, any monitored behavior information 525' that was received from the agent 162', an analysis of the content of the message performed by the agent 162, and so forth. Based on the first importance rating, the monitored behavior information 525, 525', and/or the content analysis, the communications management agent 162 can determine a time, format and/or recipient communication device for delivery of message 550C to the user 501.

In one or more embodiments, the communications management agent 162 can generate a second importance rating for the received message or a derivative message thereof that is intended to be sent to another party. For example, the message may need to be forwarded to co-workers of the user 501 to keep a record of the negotiation process but the urgency of delivery of the message is lower so the second importance rating may be designated as low.

As an example of a second importance rating for a derivative message and continuing with the landscaping contract example described above, the communications management agent 162 can receive the message from the communications management agent 162' with an importance rating of a high priority. The communications management agent 162' may agree that the message, as it pertains to delivery to the user 501 and based on other criteria including the content analysis and the monitored information 525 and/or 525', is of high priority so that the message is processed by the agent 162' for delivery to the user 501 accordingly (e.g., a text message delivered immediately to the user 501 via the portable device 516 with periodic follow-up reminders in the absence of a response from the user 501). The communications management agent 162' may also determine from the content analysis of the message and scheduling data of the user 501 that the user was scheduled to buy milk at the store when leaving work that evening per the request of the family of the user 501. The communications management agent 162 can determine that the family of the user 501 is a party related to the message and should be notified that the user 501 will be buying the milk at a later than expected time due to the potential meeting to finalize the contract. The communications management agent 162 can further determine the second importance rating for the derivative message to be delivered to one or more communications devices of the family of the user 501 (e.g., via a family communications management agent). The second importance rating can be determined by the communications management agent 162 to be of lower priority because the user 501 will still have time to purchase the milk but at a later time so the derivative message provided by the communications management agent 162 can include a medium priority rating.

In one or more embodiments, the communications management agents 162, 162' can maintain and adjust virtual task lists 163 for the users 501, 502, respectively. Adjustment of the virtual task lists can be based on a number of factors including the monitored behavior information 525, 525', content analysis of incoming messages, user interactions with the communications management agents, user preferences and so forth. The virtual task lists 163 can also be used by the communications management agents 162, 162' for delegating or otherwise requesting other users to performs tasks. In one or more embodiments, interaction data associated with the users that pertains to a prior history of tasks performed for each other, the timeliness of the completion of the tasks, the quality of performance of the task and so forth may be utilized to manage the virtual task list 163 and/or to provide requests to other users for performance of a task.

As an example, the communications management agents 162, 162' can utilize monitored behavior 525 and/or 525' to generate or otherwise determine task requests. Scheduling data and/or presence data of the monitored behavior 525, 525' can facilitate generating task requests, such as allowing communications management agent 162 to know that user 502 is presently located within a short distance of a grocery store and that scheduling data of the calendar of user 502 indicates that user 502 is not scheduled for anything this evening. In this example, the communications management agent 162 can determine from monitored behavior 525 (e.g., scheduling data and content analysis of messages related to work that needs to be performed by user 501 that evening) that it would be difficult for the user 501 to pick up milk on the way home, which is a task on virtual task list 163, because the user 501 will be leaving work very late. The communications management agent 162 can suggest to the user 501 that a task request be sent to user 502 via communications management agent 162' due in part to interaction data that indicates that the user 501 has recently performed several tasks on behalf of the user 502. In this example, upon approval of the task request by the user 501, the communications management agent 162 can forward the task request to the communications management agent 162'. Upon completion of the task, which can be monitored by the communications management agent 162, the virtual task list 163 can be adjusted to remove the task of purchasing milk.

Figure 6:
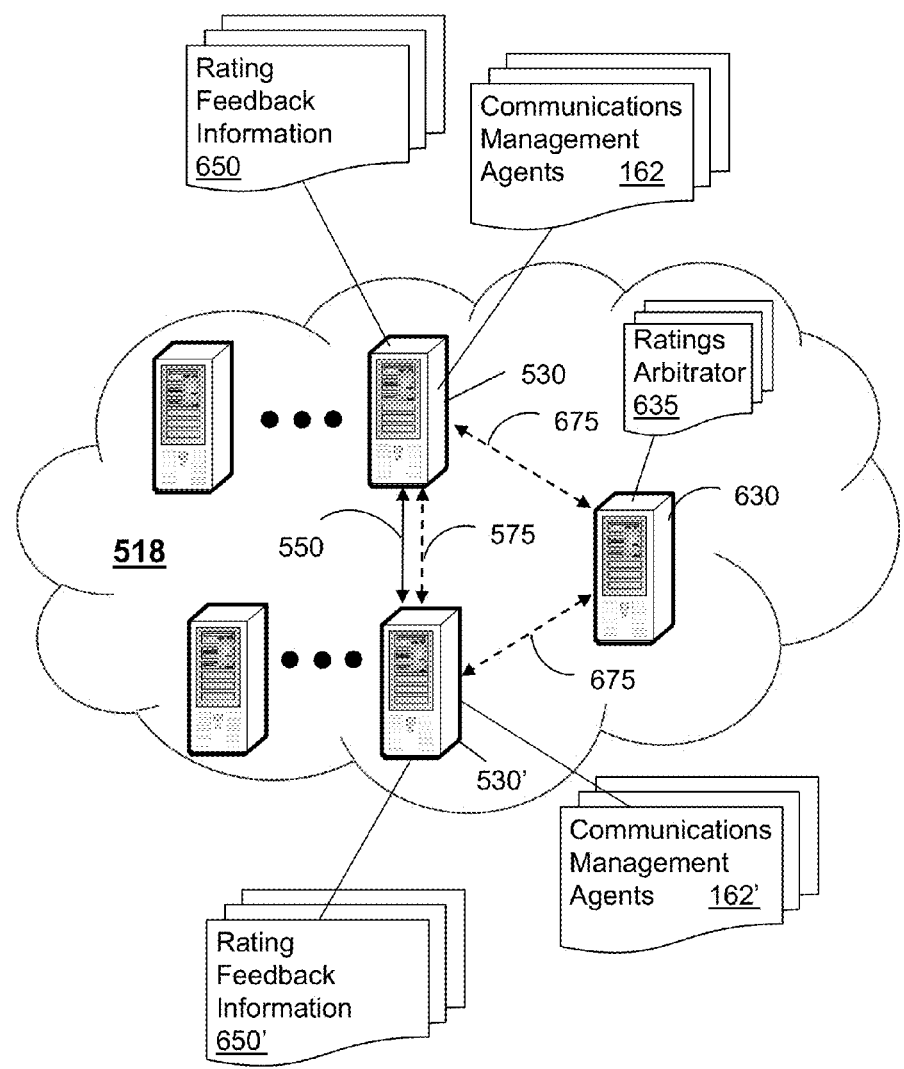

FIG. 6 depicts an illustrative embodiment of a system 600 for managing the delivery of incoming messages utilizing an importance rating system. System 600 can be overlaid or operably coupled to communication systems 100, 200 and/or 500 as another representative embodiment of communication systems 100, 200 and/or 500.

In this exemplary embodiment, communications management agents 162, 162' can be implemented on the servers 530, 530' within the network 518. Importance ratings can be generated as described with respect to system 500 of FIG. 5, including by the communications management agents 162, 162' based on content analysis, monitored behavior information, and so forth.

Communications exchanges 550 can occur between the communications management agents 162, 162', including transmitting messages, transmitting task requests, transmitting queries for further information, transmitting importance ratings, and so forth. Data exchange 575 including all or a portion of monitored behavior information, can occur between the communications management agents 162, 162', that is used by one or both of the agents 162, 162' for processing the dynamic message handling rules and/or for revising or otherwise reformatting the message.

In one or more embodiments, rating feedback information 650, 650' can be maintained by the communications management agents 162, 162'. The rating feedback information 650, 650' can be generated based on determinations, made by communications management agents and/or users, of the accuracy of importance ratings generated by other communications management agents. The rating feedback information can then be utilized in assessing the accuracy of a particular importance rating and including the accuracy determination as part of the application of the dynamic message handling rules to process delivery of the message, such as a time, format and recipient communication device for delivery of the message.

As an example, communications management agent 162 can receive a message from communications management agent 162' that includes an importance rating of a high priority. A content analysis of the message performed by the communications management agent 162 can indicate that the subject matter of the message is attending a baseball game that is scheduled more than eight months away. The rating feedback information 650 can include one or more first accuracy determinations made by the communications management agent 162 for one or more past importance ratings generated by the communications management agent 162' for messages received by the agent 162 that may or may not be related to the present message. The rating feedback information 650 can include one or more second accuracy determinations made by other communications management agents for one or more past importance ratings generated by the communications management agent 162' for messages received by the other communications management agents that may or may not be related to the present message. The communications management agent can analyze the first and/or second accuracy determinations to determine or otherwise predict the accuracy of the presently received importance rating for the presently received message. In one or more embodiments, the analysis of the first and/or second accuracy determinations can include correlating accuracy determinations with subject matter of particular messages to detect patterns, such as detecting a tendency for the communications management agent 162' to generate a high importance rating for messages related to attending social events. In this example, the communications management agent 162 can deem the accuracy of the "high priority" importance rating to be of poor accuracy based on the analysis described above, which may be performed in combination with other techniques, including the content analysis, review of monitored behavior of the user sending the message and so forth. The poor accuracy determination can be based on input from the recipient user, which may be used in addition to or in place of the accuracy determination made by the communications management agent 162.

The poor accuracy determination can be added to the rating feedback information 650 for future accuracy determinations associated with future messages and importance ratings received from the communications management agent 162'. In one or more embodiments, the poor accuracy determination by the communications management agent 162 can be forwarded to other communications management agents (e.g., corresponding to friends, family, co-workers, and so forth) for storage in their corresponding rating feedback information so that the other communications management agents can utilize the poor accuracy determination in their own accuracy determinations for importance ratings for future messages received from the communications management agent 162'.

In one or more embodiments, disputes over accuracy determinations can be resolved utilizing a ratings arbitrator 635 implemented using computer instructions executed by a server 630. The ratings arbitrator 635 can receive (as indicated by dataflow 675) pertinent accuracy information from the communications management agents 162, 162' that are involved in the dispute over the accuracy of the importance rating. The pertinent accuracy information can include the importance rating, rating feedback information, content analysis, monitored behavior of either or both of the users associated with communications management agents 162, 162', and so forth. In one or more embodiments, explanations as to why the importance rating is or is not accurate can be received from the communications management agents 162, 162' (e.g., generated by the users and/or generated by the agents 162, 162') and can be analyzed by the ratings arbitrator 635 (e.g., using parsing and/or natural language engines). The ratings arbitrator 635 can determine whether or not the importance rating was accurate and can issue a notice to the communications management agents 162, 162', as well as other communications management agents that have received an indication that the agent 162' issued an inaccurate importance rating. The notice can include information, such as a determination of the accuracy and/or a more accurate importance rating that should have been used.

Continuing with the example described above for the "high priority" importance rating for the message to attend a baseball game that was deemed as of poor accuracy, the ratings arbitrator 635 may receive pertinent accuracy information from the communications management agent 162' indicating that tickets for the baseball game are almost sold out. This information may not have been available to the communications management agent 162 when it determined that the "high priority" importance rating was of poor accuracy. The ratings arbitrator 635 may determine from this pertinent accuracy information that the importance rating assigned to the message by the communications management agent 162' was warranted because the tickets would be sold out and the recipient user associated with the communications management agent had a strong desire to attend the baseball game.

In one or more embodiments, the ratings arbitrator can be another communications management agent(s) that is requested to act a neutral party to determine the accuracy of the importance rating.

Figure 7:
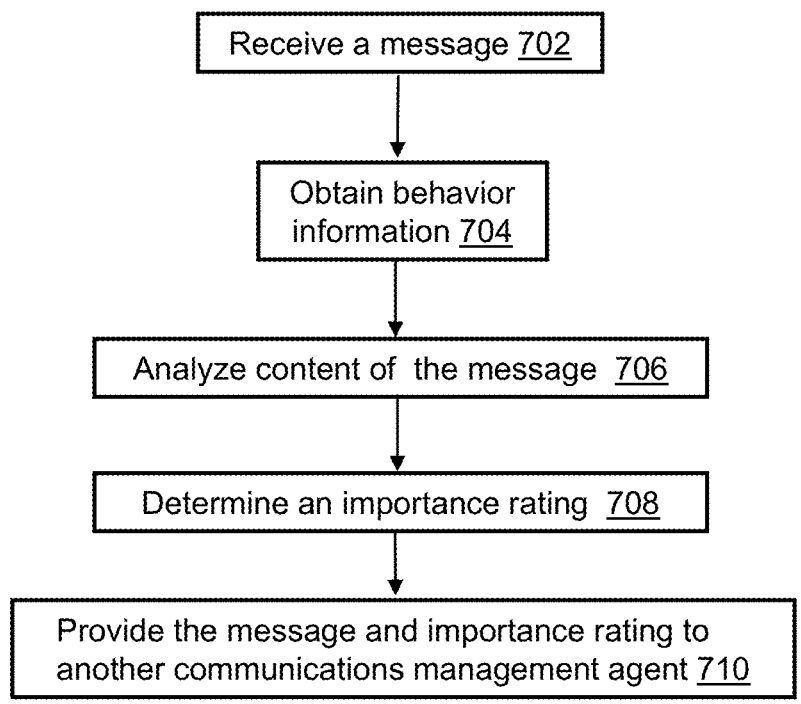
FIGS. 7-9 depict illustrative embodiments of methods operating in portions of the systems described in FIGS. 1-6.

FIG. 7 depicts an illustrative method 700 that operates in portions of the devices, systems and/or methods of FIGS. 1-6. Method 700 can begin at 702 in which a message is received or otherwise obtained by a communications management agent associated with the sender of the message. At 704, monitored behavior information can be obtained or otherwise accessed. The monitored behavior information can be associated with the sender of the message and/or the intended recipient of the message. At 706, the content of the message can be analyzed, such as through use of parsing engines, natural language engines, rhetorical libraries and/or other components and techniques to automatically analyze a message to determine a subject matter and details of the message.

At 708, an importance rating for the message can be determined based on the monitored behavior information and the content analysis. At 710, the message and the importance rating can be provided to another communications management agent that is associated with the intended recipient of the message. The message provided to the other communications management agent can be in the same format as was originated by the user (e.g., a text message) or can be in a converted format (e.g., a digital voice message that summarizes the original message). The reformatting can be performed by the communications management agent based on the monitored behavior information and/or the content analysis. While one or more of the exemplary embodiments describe agent-to-agent communications as a means for delivering user-to-user communications, the exemplary embodiments can also include use of a single communications management agent that delivers messages between users, such as where a recipient user does not have a communications management agent.

Figure 8:
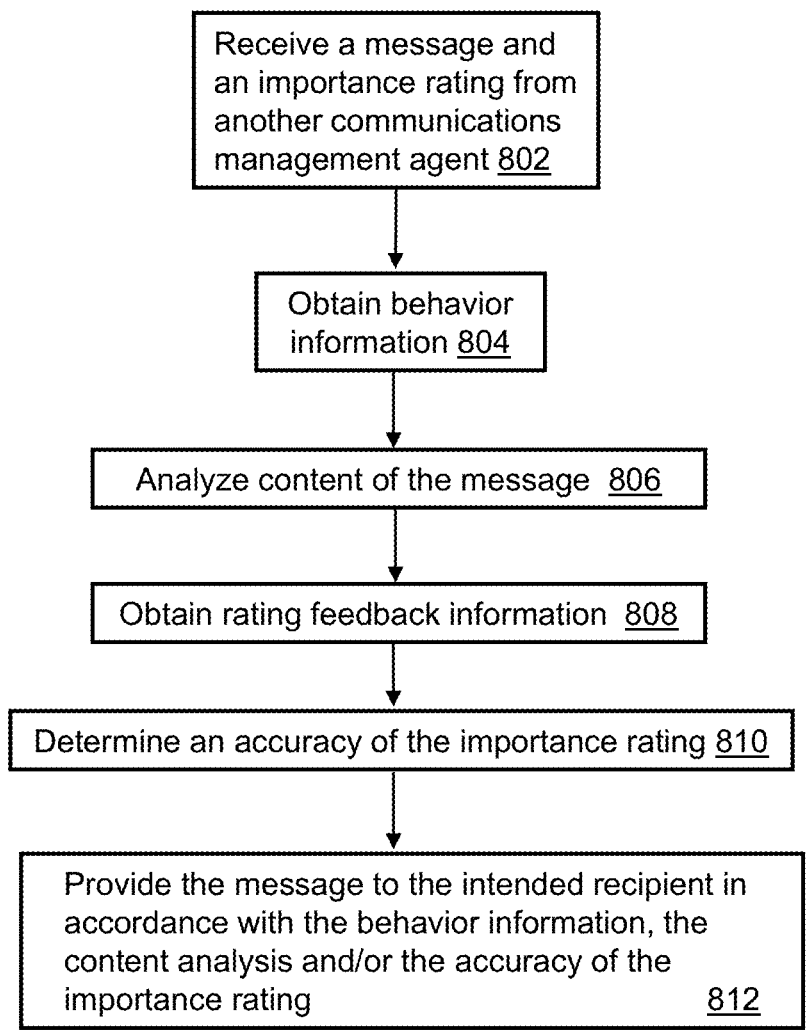

FIG. 8 depicts an illustrative method 800 that operates in portions of the devices, systems and/or methods of FIGS. 1-7. Method 800 can begin at 802 in which a message and an importance rating is received from another communications management agent. At 804, the monitored behavior information can be obtained or otherwise accessed. The monitored behavior information can be associated with the sender of the message and/or the intended recipient of the message. At 806, the content of the message can be analyzed, such as through use of parsing engines, natural language engines, rhetorical libraries and/or other components and techniques to automatically analyze a message to determine a subject matter and details of the message.

At 808, rating feedback information that is associated with the communications management agent that generated the importance rating can be obtained or otherwise accessed. At 810, an accuracy of the importance rating can be determined based on the rating feedback information, the content analysis and/or the obtained monitored behavior information.

At 812, the message can be processed according to the dynamic message handling rules for delivery to the intended recipient which is the user associated with the communications management agent performing method 800 in whole or in part. The rules can include utilizing the monitored behavior information, the content analysis and/or the importance rating to determine a time, format and recipient communication device for delivery of the message.

Figure 9:
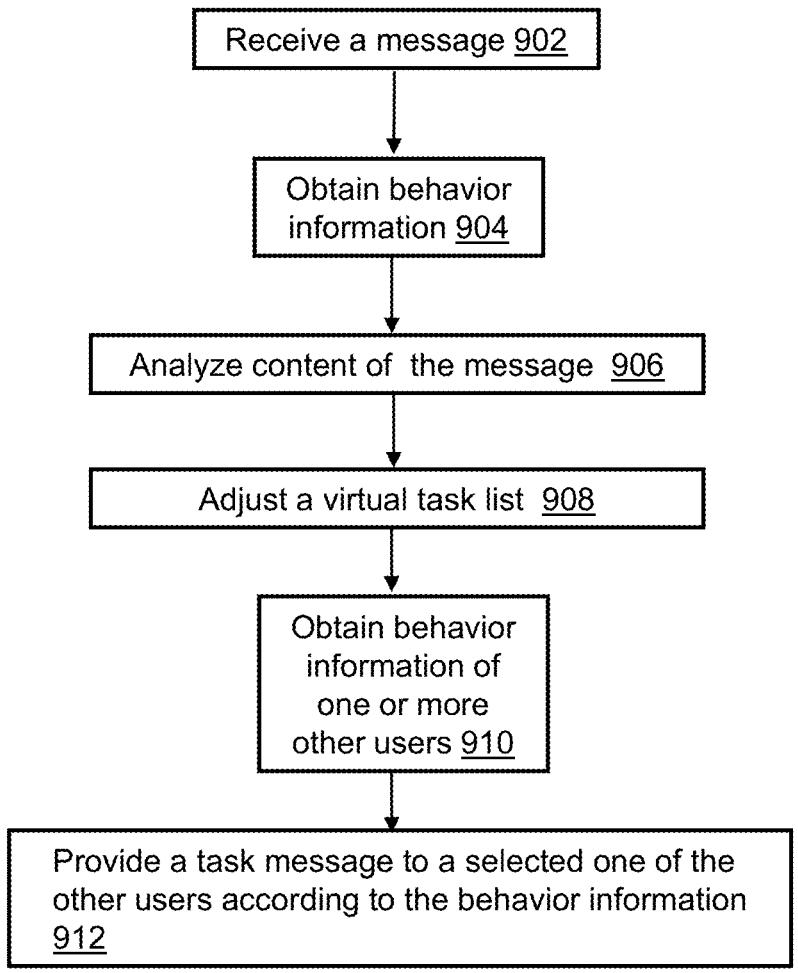

FIG. 9 depicts an illustrative method 900 that operates in portions of the devices, systems and/or methods of FIGS. 1-8. Method 900 can begin at 902 in which a message is received or otherwise obtained by a communications management agent associated with the recipient of the message. At 904, monitored behavior information can be obtained or otherwise accessed. The monitored behavior information can be associated with the sender of the message and/or the intended recipient of the message. At 906, the content of the message can be analyzed, such as through use of parsing engines, natural language engines, rhetorical libraries and/or other components and techniques to automatically analyze a message to determine a subject matter and details of the message.

At 908, a virtual task list of the recipient of the message can be adjusted based on the content of the message that indicates the task that needs to be performed. The indication of the ask can be a direct request by the sender for performance of the task or can be the result of a synthesis of the message that results in a determination that the task needs to be completed based on information described in the message. The adjustment of the virtual task list can be performed based on other factors, including the monitored behavior information (e.g., scheduling data, presence data, relationship between task requestor and recipient, and so forth), other tasks on the virtual task list, and so forth At 910, monitored behavior information can be obtained or otherwise accessed where the information is associated with other users that can potentially perform the task associated with the message. At 912, a task message or request can be provided to a select one of the other users based on the obtained monitored behavior information. For example, the monitored behavior information including presence data and scheduling data may indicate that the user's brother is in the vicinity of a grocery store and the task message may be provided to a communications management agent of the user's brother to purchase milk.

Upon reviewing the aforementioned embodiments, it would be evident to an artisan with ordinary skill in the art that said embodiments can be modified, reduced, or enhanced without departing from the scope and spirit of the claims described below. In one or more embodiments, a message can be originated from a first communication device without specifying a communication device of a second user to receive the message. In this example, the communications management agent(s) can determine the recipient device for the second user based on the monitored behavior information associated with one or both of the first and second users.

In one or more embodiments, an accuracy dispute notice associated with a rating feedback can be provided to a ratings accuracy server to initiate a second accuracy determination by the ratings accuracy server for an importance rating of a first message from a first communications management agent, where the second accuracy determination is accessible by at least some of a group of servers in analyzing the accuracy of the second importance rating for a second message provided by the second communications management agent.

In one or more embodiments, a determination of the accuracy of an importance rating generated by a first communications management agent associated with a first user can be based in whole or in part on user feedback originated at a second communication device of a second user that is the recipient of the message that includes the importance rating.

In one or more embodiments, content of a message can be analyzed to generate message information representative of the message and one or more related parties can be determined based on the analysis of the content. In this example, a second importance rating can be determined for the message. The second message information and the second importance rating can be provided to another communications management agent associated with the one or more related parties for determining a time and/or a message format for delivery of the second message information to a communication device(s) of the one or more related parties.

In one or more embodiments, a communications management agent can consider the successful delivery of a past message to a communication device of an intended recipient within a threshold time period, as a factor in applying the dynamic message handling rules (e.g., determining a time, format and/or device for delivery of the message).

In one or more embodiments, voice recognition can be utilized by a sender's communications management agent and/or a recipient's communications management agent in adjusting a format for delivery of a message.

In one or more embodiments, the communications management agents can generate avatars for the interaction with the corresponding user and/or interaction with other users. For example, the avatar can be presented at a communication device of a user to obtain verification of monitored behavior, authorization for assignment of a virtual task, preference for delivery of a message, and so forth. The form of the avatar can vary and can be based on the monitored behavior information, such as providing a humorous avatar when a determination is made that the user would be more receptive to such as avatar. In one or more embodiments, the avatar can develop over time as the user changes, where the changes in the user are determined by the communications management agent based on the monitored behavior information.

In one or more embodiments, additional dimensions of task lists may exist alongside the main task list, such as if the receiving agent recognizes that its single-dimensional rating is low but likely to be very inaccurate and other attributes suggest it may be important, it may be placed in a queue or list that enjoys quick and lightweight attention from the recipient. This can be subject to use limitations and/or the recipient's tolerance for such interruptions, but can be useful for automating the learning and tuning the rating algorithms and could provide a defense against missing important messages.

Figure 10:
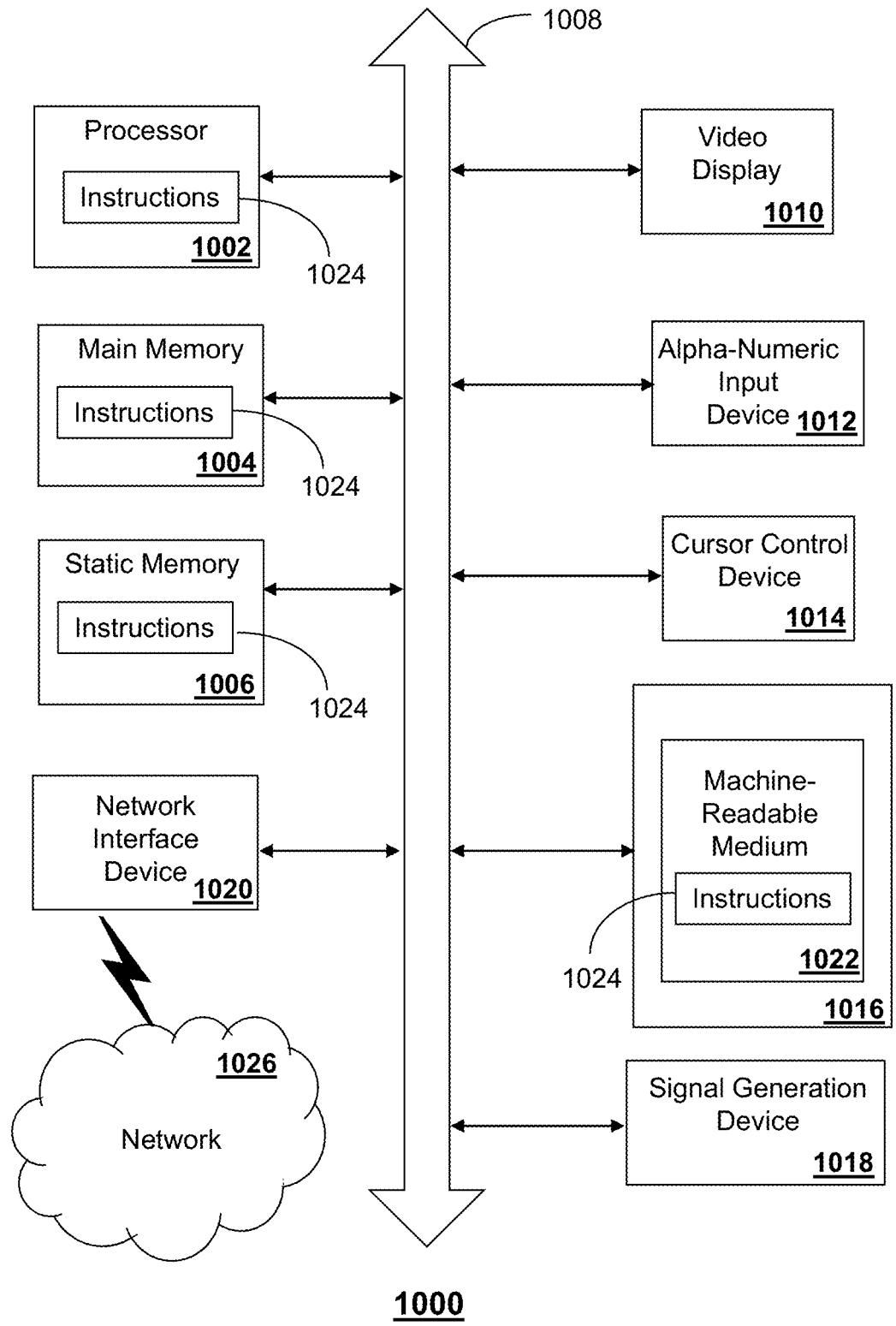
FIG. 10 is a diagrammatic representation of a machine in the form of a computer system within which a set of instructions, when executed, may cause the machine to perform any one or more of the methods discussed herein.

FIG. 10 depicts an exemplary diagrammatic representation of a machine or controller circuit in the form of a computer system 1000 within which a set of instructions, when executed, may cause the machine to perform any one or more of the methods discussed above. One or more instances of the machine can operate, for example, as the server 130, 530, the media processor 106, 506, the media device 108, 508, the portable communication devices 116, 516, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, or a solid state display. The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
a memory that stores instructions; and
a controller circuit coupled to the memory, wherein the controller circuit, responsive to executing the instructions, performs operations of a first communications management agent, the operations comprising:
determining an importance rating of a message associated with first and second users, wherein the importance rating is determined based on a subject matter of the message and monitored user behavior;
providing the message and the importance rating to a second communications management agent that is associated with the second user and that distributes the message to a second communication device of the second user based on the importance rating; and receiving a rating feedback based on a determination, performed by the second communications management agent, of an accuracy of the importance rating for the message.

2. The server of claim 1, wherein the determination of the accuracy of the importance rating is based on user feedback that originates at the second communication device.

3. The server of claim 1, wherein the message originates from a first communication device of the first user without specifying a communication device of the second user to receive the message, wherein the second communications management agent determines a time and message format for receipt of the message by the second communication device of the second user based on the importance rating, and wherein the monitored user behavior is associated with the first and second users.

4. The server of claim 1, wherein the operations comprise:
providing a second message to a third communications management agent that is associated with a third user, wherein the rating feedback is received by the third communications management agent and is utilized by the third communications management agent in analyzing an accuracy of a second importance rating for the second message provided by the controller circuit.

5. The server of claim 1, wherein the operations comprise:
collecting the monitored user behavior from presence data and scheduling data; and
receiving the message from a first communication device of the first user, wherein the message is directed from the first user to the second user.

6. The server of claim 1, wherein the operations comprise analyzing content of the message to determine the subject matter of the message, and wherein the monitored user behavior includes monitoring interaction of equipment of the first user with a social network website.

7. The server of claim 1, wherein the operations comprise applying voice recognition to the message to generate a text message.

8. The server of claim 1, wherein the operations further comprise:
providing an accuracy dispute notice associated with the rating feedback to a ratings accuracy server to initiate a second accuracy determination by the ratings accuracy server for the importance rating of the message.

9. The server of claim 8, wherein the second accuracy determination is accessible by a group of communications management agents in analyzing accuracy of a second importance rating for a second message provided by the controller circuit.

10. A method comprising:
obtaining, by a system including a processor, an importance rating for a message, wherein the importance rating is determined by a communications management agent based on an analysis of content of the message, wherein the importance rating is an estimate of a priority for the message;
obtaining, by the system, rating feedback information associated with a group of importance ratings generated by the communications management agent, wherein the rating feedback information was generated by other communications management agents that received the group of importance ratings from the communications management agent; and
determining, by the system, a rating accuracy of the importance rating for the message based on the rating feedback information, wherein the rating accuracy is an evaluation of whether the importance rating accurately estimates the priority for the message.

11. The method of claim 10, wherein the rating feedback information includes user input from equipment of message recipients, wherein the message originates from a first communication device of a first user, wherein the message is directed to a second user, and further comprising:
providing message information representative of the message to a second communication device of the second user according to the importance rating and the rating accuracy.

12. The method of claim 11, further comprising:
monitoring, by the system, behavior information associated with the second user, wherein the behavior information includes scheduling data; and
determining, by the system, a time and a message format for providing the message to the second communication device of the second user based on the importance rating and the rating accuracy, wherein the time and the message format is determined based on the behavior information.

13. The method of claim 12, wherein the behavior information includes presence data.

14. The method of claim 10, wherein the message originates from a first communication device of a first user directed to a second user without specifying a communication device of the second user to receive the message.

15. The method of claim 10, comprising:
analyzing the content of the message;
generating second message information representative of the message based on the analysis of the content;
determining a related party based on the analysis of the content;
determining a second importance rating for the message; and
providing the second message information and the second importance rating to another communications management agent associated with the related party for determining a time and a message format for delivery of the second message information to a communication device of the related party.

16. The method of claim 10, comprising generating a rating feedback for the message based on user input, wherein the rating feedback is accessible by other communications management agents in analyzing an accuracy of a second importance rating for a second message associated with the communications management agent.

17. The method of claim 10, wherein the message originates from a posting on a social network website.

18. A computer readable storage device comprising computer instructions which, responsive to being executed by a server cause the server to perform operations of a first communications management agent, the operations comprising:
determining an importance rating of a message associated with first and second users, wherein the importance rating is determined based on a subject matter of the message and monitored user behavior;
providing the message and the importance rating to a second communications management agent that is associated with the second user and that distributes the message to a second communication device of the second user based on the importance rating; and
receiving a rating feedback based on a determination, performed by the second communications management agent, of an accuracy of the importance rating for the message.

19. The computer readable storage device of claim 18, wherein the determination of the accuracy of the importance rating is based on user feedback that originates at the second communication device.

20. The computer readable storage device of claim 18, wherein the message originates from a first communication device of the first user without specifying a communication device of the second user to receive the message, and wherein the monitored user behavior is associated with the first and second users.

* * * * *